United States Patent [19]

Boots

[11] 4,430,933
[45] Feb. 14, 1984

[54] TRIMMER FOR VEGETABLES USING FIXED SHEAR BAR AND UNSHARPENED ROTARY MEMBERS COOPERATIVE THEREWITH

[75] Inventor: Vernie A. Boots, Belle Glade, Fla.

[73] Assignee: A. Duda and Sons, Oviedo, Fla.

[21] Appl. No.: 104,413

[22] Filed: Dec. 17, 1979

[51] Int. Cl.³ .................... A23N 15/00; A23N 15/04; A23N 15/08
[52] U.S. Cl. ........................................ 99/641; 99/516; 99/536; 99/546; 99/637
[58] Field of Search ................. 99/635, 637, 639, 640, 99/641, 546, 642, 643, 385, 624, 516, 536

[56] References Cited

U.S. PATENT DOCUMENTS

| | | | |
|---|---|---|---|
| 877,670 | 1/1908 | Shufelt | 99/639 |
| 1,368,487 | 2/1921 | Cihak | 99/639 |
| 1,671,263 | 5/1928 | Zuckerman | 99/639 |
| 2,414,922 | 1/1947 | Barrett et al. | 99/639 |
| 3,519,049 | 7/1970 | Tomelleri | 99/640 |

FOREIGN PATENT DOCUMENTS

455736  2/1975  U.S.S.R. ................................ 99/640

*Primary Examiner*—Timothy F. Simone
*Attorney, Agent, or Firm*—Julian C. Renfro

[57] ABSTRACT

A machine for accomplishing the removal of leaves and other unwanted portions from vegetables comprising an elongate shear bar having two opposed, machined edges and a pair of elongate members mounted for rotation in close proximity to the machined edges. Each of the elongate rotary members are of the approximate length of the shear bar, and each has at least one helically configured raised portion extending along a substantial portion of its length, with the raised portion of each rotary member being arranged to operate close to the respective machined edge of the shear bar, such that a shearing action can be accomplished without damage to the vegetables. The direction of rotation of each of the elongate rotary members with respect to the adjacent machined edge of the shear bar, and the angle of the helically configured raised portions are such that vegetables or the like placed on the rotary members are caused to be moved toward one or the other of the machined edges of said shear bar, such that stems, roots or other unwanted components can be sheared from the vegetables as a consequence of the interaction between the raised portions of the rotary members, and the respective machined edges of the shear bar.

12 Claims, 13 Drawing Figures

TRIMMER FOR VEGETABLES USING FIXED SHEAR BAR AND UNSHARPENED ROTARY MEMBERS COOPERATIVE THEREWITH

BACKGROUND OF THE INVENTION

In the past, a number of machines have been proposed for bringing about a trimming of vegetables such as radishes, onions and the like, such that roots, stems, leaves, or other unwanted portions can be removed relatively rapidly.

Such machines of the prior art have taken a number of forms, including the use of a number of chain driven, flighted members designed to interact together in such a way as to remove certain portions of vegetables caused to pass thereover.

A machine exemplary of such devices is a machine manufactured by Haines Equipment Co. of Avoca, N.Y., utilizing a co-planar array of flighted member that cooperate together to achieve a topping of onion plants. While satisfactory for some purposes, devices of that type in which no stationary shear bar is utilized simply are not suitable for the satisfactory removal of unwanted portions from certain vegetables, such as radishes.

Another type of prior art machine involves rotary cutter members designed to rotate adjacent the edge of a sharpened shear bar, and although machines of this type have been satisfactory for many purposes, they have been completely unsatisfactory for use with vegetables such as radishes, for cuts or nicks to the bodies of such vegetables will markedly affect the saleability thereof.

It was for the purpose of improving upon prior art devices of this general type that I evolved the present high speed trimmer designed to provide a highly effective shearing action upon unwanted portions of certain vegetables.

SUMMARY OF THE INVENTION

In accordance with this invention, I have provided a machine for accomplishing the non-injurious removal of leaves, stems, and other unwanted portions from vegetables, comprising an elongate shear bar having two opposed, machined edges, and a pair of elongate members mounted for rotation in close proximity to the machined edges.

Each of the rotary members is of the approximate length of the stationary shear bar, and each has at least one helically configured raised portion extending along a substantial portion of its length. The raised portion of each rotary member is unsharpened, and is arranged to operate close to the respective machined edge of the shear bar such that an effective shearing action can be accomplished.

The direction of rotation of each of the elongate rotary members with respect to the adjacent machined edge of the shear bar, and the angle of the helically configured raised portions thereon are such as to cause vegetables or the like to be moved toward one or the other of the machined edges of the shear bar, such that leaves or other unwanted components can be sheared from the vegetables as a result of the interaction between the raised portions of either of the rotary members, and the respective machined edge of the elongate shear bar.

Although I can utilize a trimmer unit in the form of a single shear bar and its pair of rotary members, it is within the spirit of this invention to utilize a number of trimmer units in accordance with this invention in a coplanar array, with the rotary members of the array being powered from a common driving means.

I prefer for one end of the coplanar array to be higher than the other end, so that vegetables can be delivered such as by a conveyor belt to the high end of the trimmer array, with the vegetables thereafter passing the length of the array under at least some influence of gravity, such that a trimming of roots, leaves and the like can be rapidly effected without injury to the vegetables. A conveyor belt may also be utilized at the lower end of the array such that the trimmed vegetables are quickly removed and carried to another location for further processing.

In many instances I prefer to direct a spray of water upon the vegetables as they pass down the length of the trimmer array, with this spray serving to keep roots, leaves, stems and the like from accumulating on the stationary shear bar or bars utilized in the array.

While the shear bar is stationary during its operation, it is precisely adjustable in accordance with the invention, so as to give a desired small amount of clearance with respect to the revolving flighted members. It is desirable to maintain a clearance of between 0.0005 and 0.0025 inches between the flights of each rotary member, and the respective machined edge of the shear bar.

It is therefore a principal object of my invention to provide an automatically functioning trimmer unit for removing unwanted portions from vegetables quickly, easily, an inexpensively, and without damage to the vegetables.

It is another object of my invention to provide a novel trimmer/cleaner unit utilizing a stationary, double sided shear bar with which a pair of elongate, flighted rotary members interact in order to bring about an effective trimming action on vegetables passing thereover.

It is yet another object of my invention to use a vegetable trimmer utilizing no sharpened cutting edges, but yet that can effectively and cleanly remove unwanted portions from vegetables.

It is yet still another object of my invention to provide a novel high speed trimmer for vegetables, usable in a relationship with conveyor belts designed to accomplish loading and unloading functions, such that a fully automatic yet inexpensive machine is made readily available to growers and packers.

These and other objects, features and advantages will be more apparent as the description proceeds.

DETAILED DESCRIPTION

Figure 1:
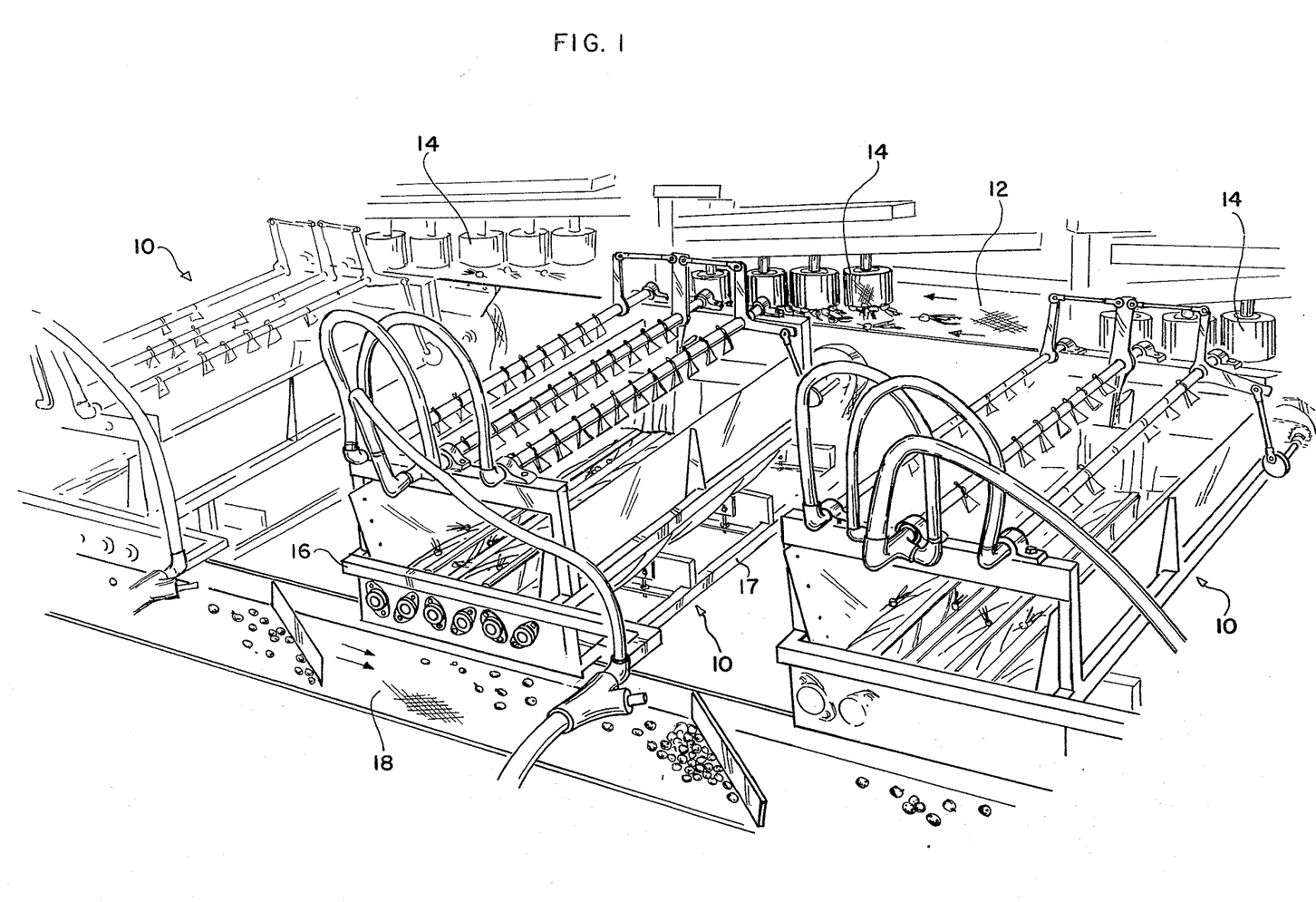
FIG. 1 is an overall perspective view of a plurality of my trimmer machines being utilized in connection with conveyor belts for loading produce from the fields into the machines, and carrying away the trimmed produce from the machines.

Turning to FIG. 1, it will there be seen that I have shown a typical installation of machines concerned with the trimming of roots and stems from radishes or other such vegetables. Although in some instances a single machine 10 is utilized, in other instances this may involve a plurality of machines 10 disposed in an essentially parallel relationship between a pair of conveyor belts, with the longitudinal dimensions of each of these belts preferably being disposed perpendicularly to the centerlines of the machines. In the illustrated embodiment, conveyor belt 12 is concerned with bringing untrimmed vegetables from the field, with certain rotary produce removal means 14, preferably driven by hydraulic means, being utilized at spaced locations just above belt 12. The devices 14 are designed and positioned to cause a selected percentage of vegetables to be removed from the belt 12 onto each of the several machines of the array, such that each machine handles an essentially equal amount of produce.

Figure 2:
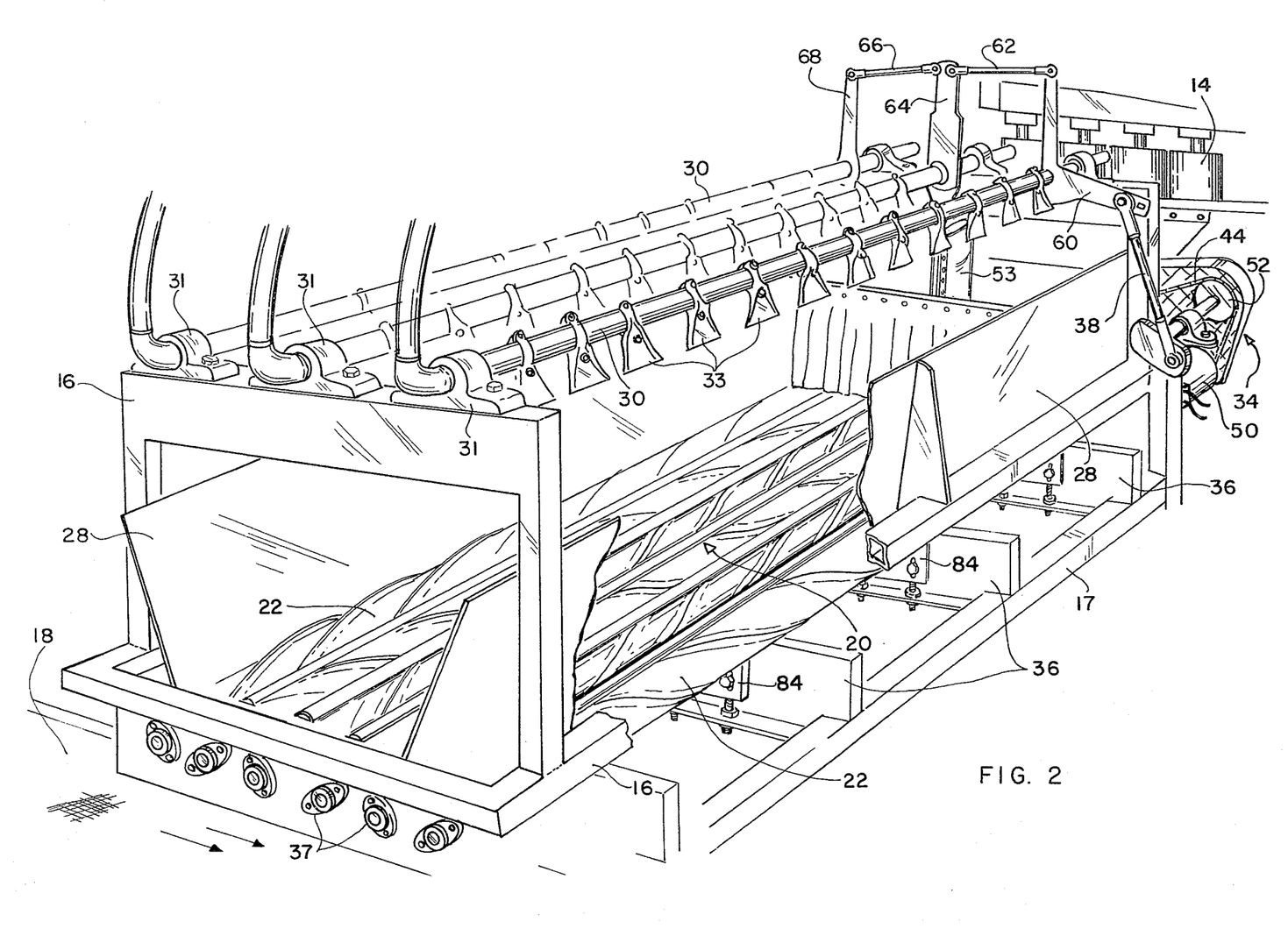
FIG. 2 is perspective view to a somewhat larger scale of a typical trimmer machine in accordance with my invention, with certain portions broken away in order to reveal trimmer units disposed in a planar array.
Figure 3:
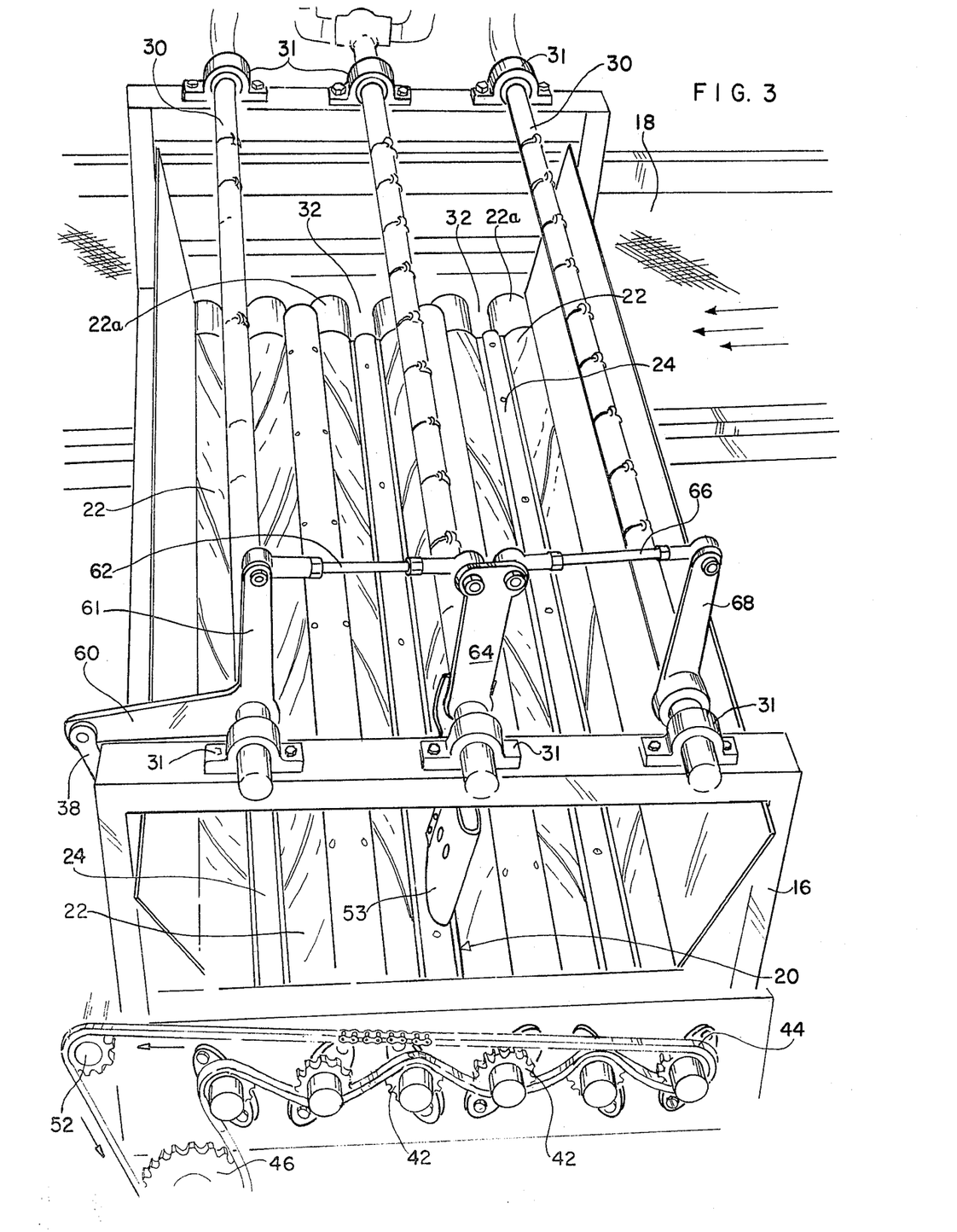
FIG. 3 is an end view of my machine looking from the loader end toward the discharge end, with this view revealing the means employed for driving in rotation, the elongate rotary members forming a part of each trimmer unit.

As shown in FIGS. 2 and 3, each of the machines 10 utilizes a framework 16 serving to support a plurality of novel elongate components concerned with the trimming of leaves and roots from the radishes or other vegetables to be prepared for market. The novel trimmer components, comprising rotary, flighted components 22 and associated shear bar 24, are disposed in a coplanar array 20 extending across the inside bottom of each machine, with major dimension of the plane of these components sloping away from the conveyor belt 12 and toward a conveyor belt 18 associated with carrying the trimmed vegetables to another location for further processing; note FIG. 2. In this way, movement of the radishes or other produce down along the trimmer components is, to a substantial extent, under the influence of gravity, although the action of the flighted members plays a part in moving the radishes along.

As will be described at greater length hereinafter, and as perhaps best shown in FIG. 4, the novel trimmer components involve one or more pairs of the elongate, roller-like members 22, each adjacent pair of which operate in concert with a double edged stationary shear bar 24, whose length approximates that of the associated rotary components. As will be explained hereinafter, the shear bar is supported by a plurality of laterally disposed support members 36, the ends of which rest upon members 17, as generally illustrated in FIG. 2.

The exterior of each rotary member 22 is equipped with a plurality of helically disposed flights 26, which are spaced so as to be angularly equidistant from each other, with their radially-outermost edges set to reside very close to the respective machined edge of the double edged shear bar 24. Each pair of rotary components 22 are driven in opposite directions of rotation to each other, with the direction in each instance being such that the flights 26, which are of opposite hand, serve to move the radishes or other produce toward the respective machined edge of the shear bar 24, as well as toward the discharge end of the machine, such that the trimming of stems, roots and leaves from the produce will be rapidly accomplished, but in a non-injurious manner insofar as the vegetables are concerned.

Figure 4:
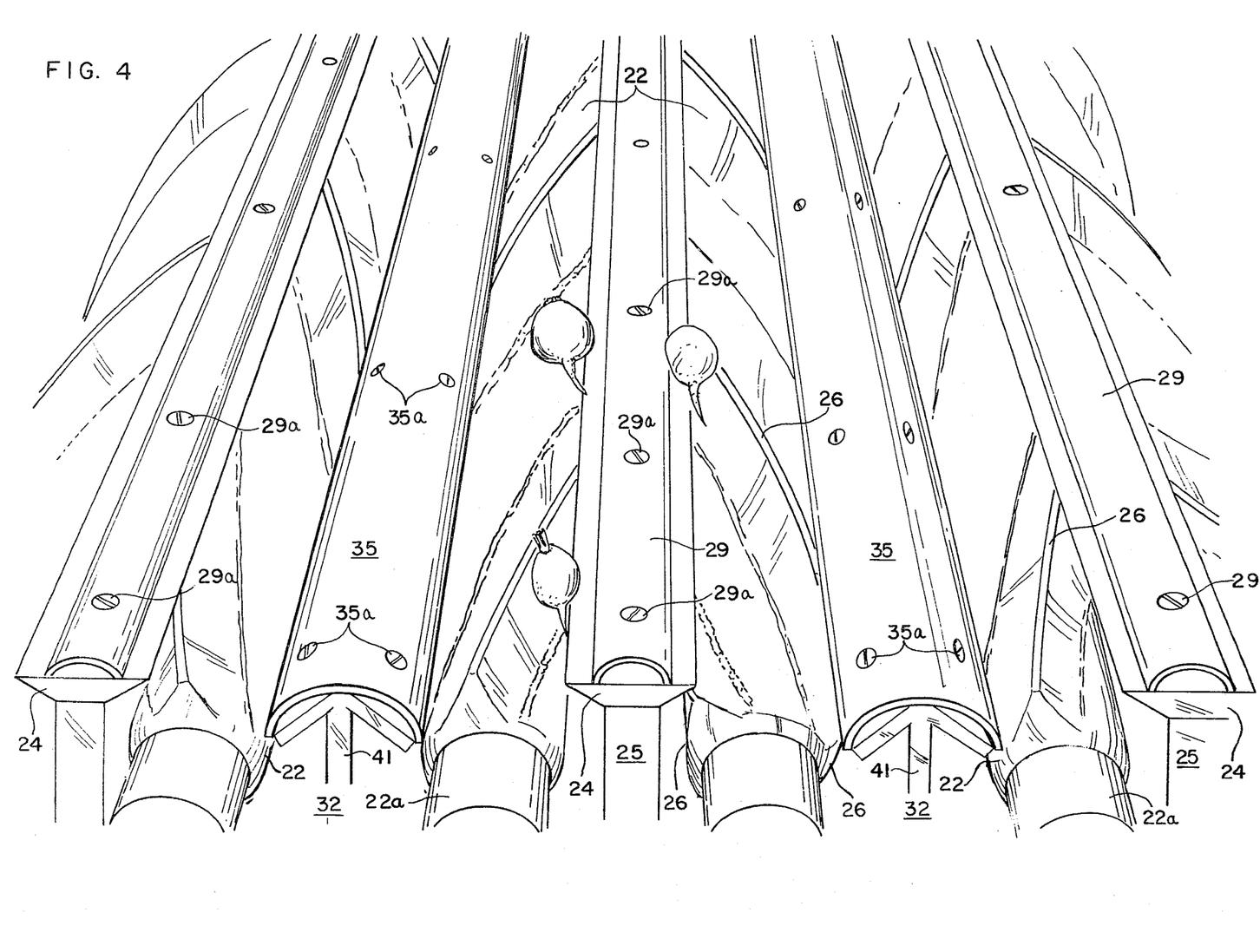
FIG. 4 is a view to a still larger scale, showing that interaction between flighted elongate rotary members, and the shear bar used with each pair of such members.

In each instance, the helically disposed flights 26 stop short of the exit ends of the roller-like members 22, and the final four inches or so of the lower ends of members 22 are of reduced diameter in order that the trimmed radishes may pass through passages 32 between the ends and fall onto the belt 18; note ends 22a in FIGS. 3 and 4.

Returning to FIG. 2, it will be seen that I have illustrated a typical machine 10 in accordance with this invention to a larger scale, with it being noted that sides 28 are used on the machine in order to keep vegetables moving down along the length of the coplanar array of trimmer components from failling off the machine. Illustrated in this figure is the preferred arrangement of three trimmer units per machine, with each unit of course involving an elongate stationary shear bar 24 along with an accompanying pair of counter-rotating members 22, but quite obviously I can use either a larger or smaller number of trimmer units in a given array, including even an embodiment in which a single shear bar 24, and one or a pair of flighted members 22 are utilized. Individual bearing support members 37 are utilized on the ends of the machine for supporting the rotary members 22 in carefully adjusted positions; note FIG. 2.

I have found it desirable to maintain a spray of water on the vegetables as they move down along the trimmer units, and to that end we employ an array of water pipes 30, preferably disposed in a plane located say 18" above the plane of the trimmer components, as depicted in FIG. 2.

The underside of each of the water pipes is equipped with a number of small spray means for providing flat sprays, these preferably being Link Belt Spray Nozzles.

Figure 5:
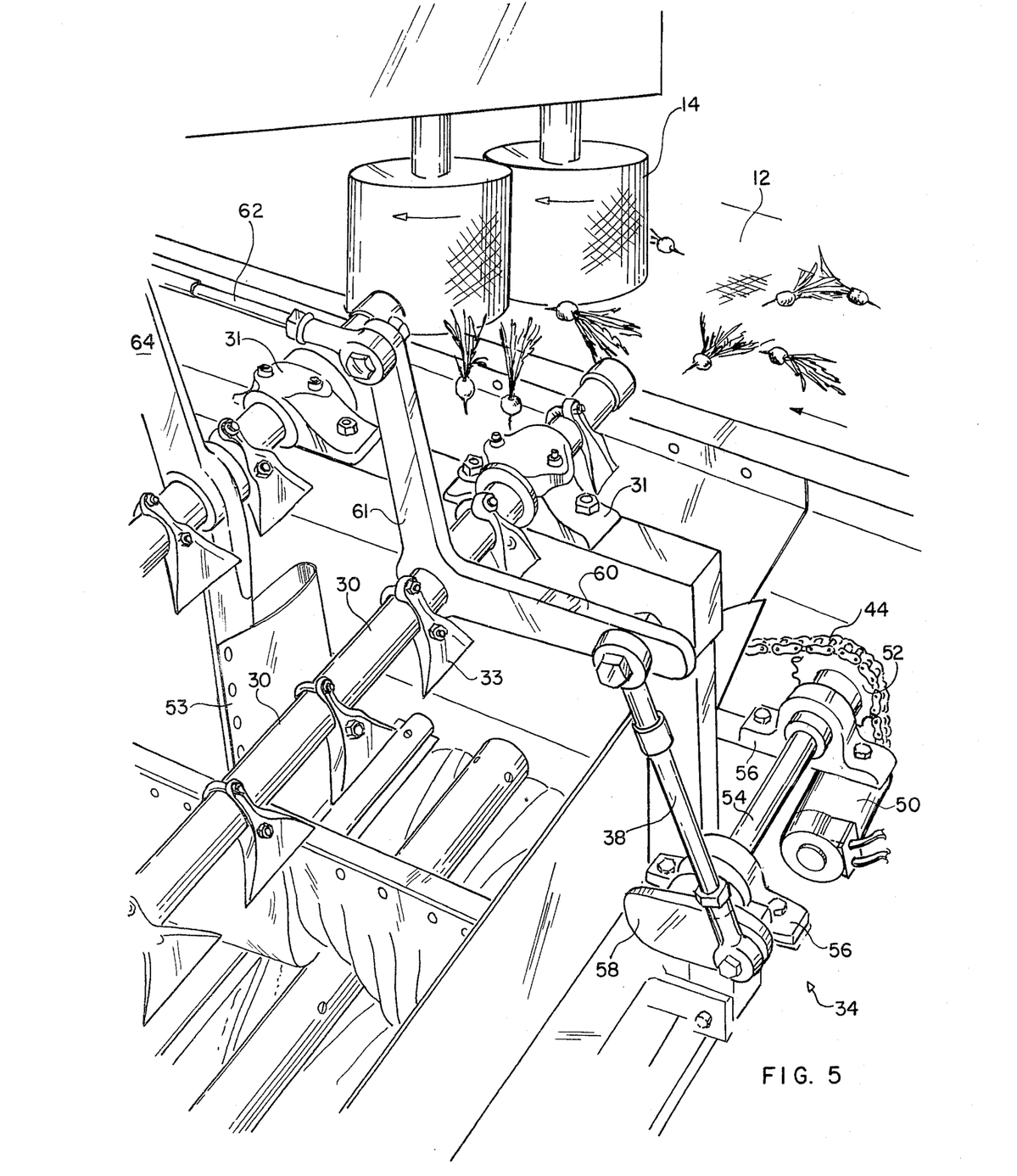
FIG. 5 is a fragmentary perspective view revealing a preferred form of oscillation means utilized not only for spreading radishes to be trimmed evenly over the trimmer unit array, but also for bringing about an oscillation of certain water sprays used to keep the stationary shear bars free of leaves, roots and other debris.

This may involve drilling say a 3/16" hole every six inches along the bottom of each pipe, and then securing a slightly cupped spray deflector 33 adjacent each of such holes, as shown in FIG. 2, and in more detail in FIG. 5. The wide dimension of the deflectors 33 is parallel to the length dimension of the pipes 30, and as a result, the flat sprays so created are parallel to the pipes and the shear bars.

Although the water spray will have the effect of removing dirt from the radishes and enhancing their appearance, such is not the primary purpose of the spray, which is to keep the non-rotary components of the trimmer assembly free from roots, leaves and other debris that would impair the operation thereof, and to assure desirable movement of the radishes along the trimmer units.

I prefer to mount the ends of the water pipes 30 in suitable bearing members 31 such that a certain amount of oscillatory type motion of the pipes therein can occur. That such oscillation may be brought about, we utilize an eccentric device 34 adjacent the upper or entrance end of the machine, which is connected by a linkage 38 to the first water pipe. As will be described in connection with FIGS. 3 and 5, other links are used in order to connect the remaining pipes such that oscillation of the several members, and the sprays therefrom will take place in unison.

In FIG. 3 it will be noted that a chain sprocket 42 is disposed on a shaft member extending from the upper or entrance end of each of said roller-like members 22, with an endless chain 44 contacting each of the sprockets 42 in the manner illustrated in this Figure. Inasmuch as it is desirable for the upper portions of each rotary member 22 of each trimmer unit to turn toward the respective machined edge of the stationary shear bar 24, I thread the chain 44 alternately above and below the sprockets 42 in the manner shown in FIG. 3 since this will result in the two rotary members of each trimmer unit turning in a proper, counter-rotating manner.

The chain 44 is driven by a sprocket 46 which is in turn driven in rotation by a hydraulic motor 50 that typically is mounted on the framework 16 at a location below the plane of the trimmer units; note FIGS. 2 and 5. In addition to driving the sprockets 42, the chain 44 also drives sprocket 52 associated with the eccentric device 34 utilized to bring about oscillation of the water pipes 30 concerned with providing a spray that helps keep the shear bars 24 clear of leaves and roots.

As will be noted in FIGS. 2, 3 and 5, I prefer to use a spreader 53 associated with the oscillatory means for the water pipes. The spreader moves back and forth across the width direction of the machine, and by virtue of the proximity of its lower portion to the coplanar array 20, it serves to move the freshly dumped radishes evenly across the array of rotary members 22.

In FIG. 4 it will be noted that each shear bar 24 is directly supported by a respective upstanding member 25 located midway between each cooperating pair of rotary members 22. Each shear bar is attached such as with screws 40 to its member 25 in the manner shown in FIG. 9. The means by which each shear bar can be adjusted heightwise as well as laterally involves an important facet of my device, and will be described hereinafter at some length.

Inasmuch as it is highly undesirable for roots, leaves and the like to be allowed to accumulate on the shear bars of the assembly, I prefer to utilize domed members 29 such as of plastic directly above the shear bars 24 so that any material tending to accumulate on a shear bar can be easily swept off by the oscillating water spray. These plastic members are preferably held in place by a series of stainless steel screws 29a.

In a somewhat analagous manner, I also prefer to use domed deflectors 35 such as of plastic between each pair of trimmer units, thereby to prevent radishes or the material removed from the radishes from falling down between the rotary members. The domed deflectors are supported by members 41 and held in place by screws 35a.

Turning again to FIG. 5, it will be seen that I have shown the eccentric device 34 in greater detail, with it being revealed in this figure that the sprocket 52 driven by the chain 44 is mounted on a shaft 54 that is in turn supported from a pair of bearings 56. Located on the end of the shaft 54 remote from the sprocket 52 is an eccentric member 58 to one end of which is rotatably mounted, the lower end of link 38. The upper end of link 38 is connected to the near arm of bell crank 60 that is affixed to the first water pipe 30 in the manner shown in FIGS. 3 and 5. The upper portion 61 of the bell crank stands essentially vertically above the waterpipe 30 and rotatably connects to a horizontal link 62.

As shown in FIGS. 2 and 3, the first horizontal link 62 is connected at its other end to a vertical arm 64 which is affixed to the center water pipe. A second horzontal link 66 extends across toward the third water pipe, and connects to a vertical arm 68 extending upwardly from that pipe.

By virtue of the mounting of the pipes 30 in bearing members 31 that permit motion, the rotation of the sprocket 52 as a consequence of meshing with chain 44 causes the eccentric member 58 to bring about a desirable motion of the components described above, with the result that the waterpipes take on a form of oscillatory motion. The spray from the pipes assures the components of this device remaining unclogged from any buildup of roots and leaves. As revealed in FIG. 5, the spreader 53 may be secured directly to the center water pipe 30 such as by clamping, or alternatively it may be mounted upon a lower extension of member 64. In any event, the spreader 53 will move in the same oscillatory manner as the water pipes.

Figures 6, 7:
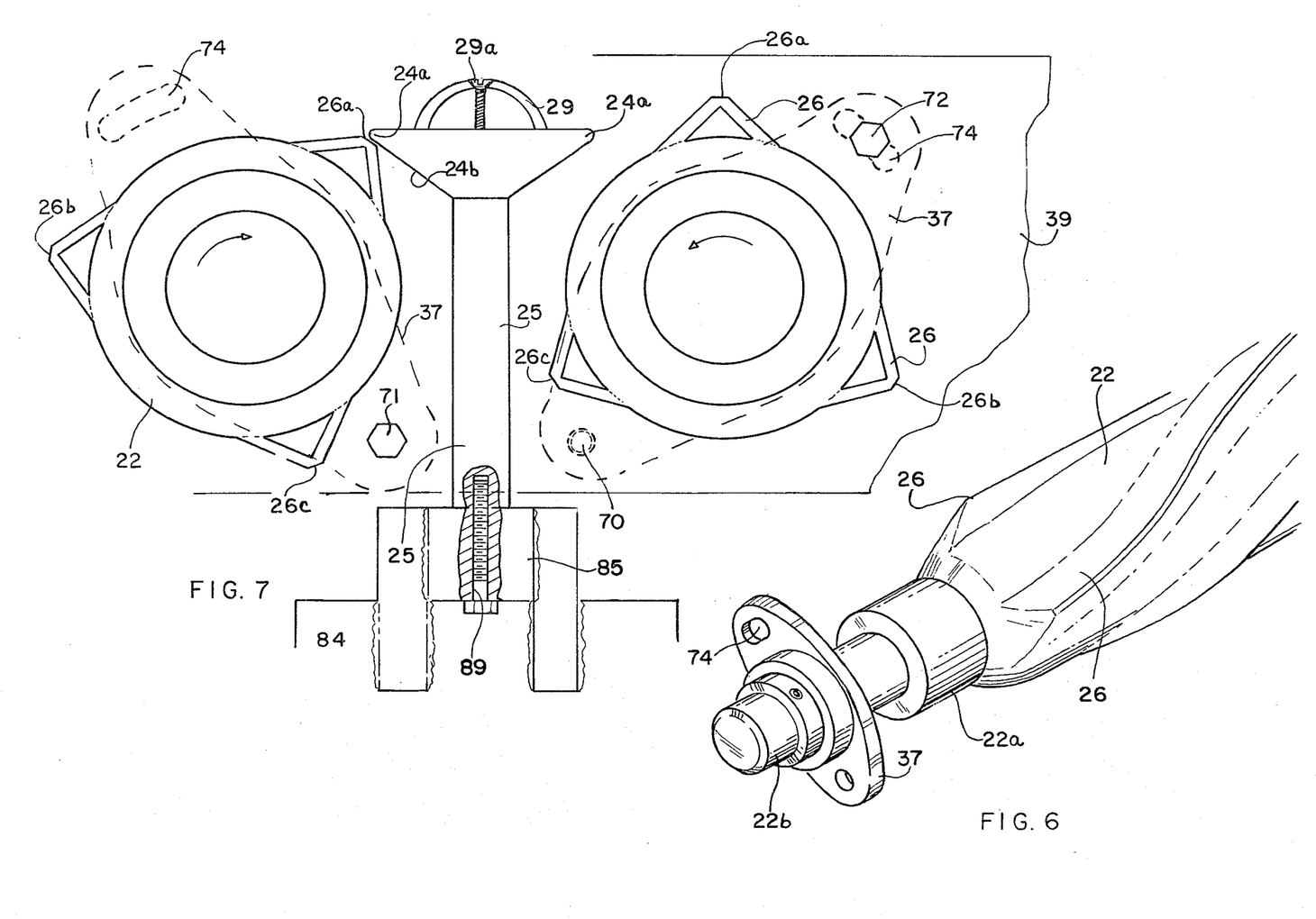
FIG. 6 is a fragmentary end view to a large scale of the discharge end of a typical flighted member arranged, in accordance with this invention, to rotate closely adjacent a stationary shear bar.
FIG. 7 is an end view of a trimmer unit constituted by a stationary shear bar flanked by a pair of flighted members, with such members in this exemplary device each having three flights that interact with machined edges of the shear bar.

Turning to FIGS. 6 and 7, it will be noted that I have shown in greater detail, the primary constituents of the novel trimmer units in accordance with this invention. As previously mentioned, I may utilize in a given machine either a single unit, or a plurality of trimmer units disposed in a coplanar array, with the upper portions of each of the rotary members 22 in each instance turning toward the respective stationary shear bar equipped with the pair of machined edges, with which edges the flights 26 are intended to interact. A shaft member 22b extends outwardly from each end of the member 22, which shaft members are received in suitable bearings supported in the end plates of the machine. A typical bearing arrangement is shown in FIG. 6.

In FIG. 7 it will be noted that I have illustrated the manner in which the bearing support members 37 are mounted on the end plate 39. The lower end of each member 37 is supported by a bolt 71 threaded into a tapped hole 70, whereas the upper end of each member 37 is supported by a bolt 72 placed in a slot 74 in each member 37. By loosening the nut associated with each bolt 72, the ends of a given rotary member 22 can be adjusted so as to bring about a desirable relationship of the flights 26 to the respective machined edge of the shear bar, for the slots 74 are of sufficient length to permit this.

The helically disposed flights 26 utilized on the members 22 in accordance with this invention may take different forms, but I prefer to weld three or so symmetrically placed angles on the periphery of a tubular member, with each flight making one complete revolution in say 48 inches of length. Although I am not to be so limited, the flight angle may be at an angle of say 10.7 degrees to the centerline of the member 22, as generally indicated in FIG. 6, which is sufficient angularity to amply serve the purpose of moving the radishes toward the shear bar 24 as the radishes move down the coplanar array 20 under the cooperating influence of gravity and the flights 26.

I obviously am not to be limited to any particular type of flight construction, but in one embodiment we successfully utilized three flights of stainless steel angle, 1"×1"×3/16" spaced 120 degrees apart, with the angle members welded to the exterior of stainless steel tubing, and with the radius at the location of each flight, measured from the longitudinal centerline of each member 22, being 1.875 inches.

The helically disposed members 26 are preferred over straight members for the reason that they serve to move the radishes laterally, such that the radishes are brought into a potentially shearing relationship with the shear bar 24 for a number of times during their passage through the machine, thus assuring that they are properly trimmed. Another important reason for using helically configured members 26 is that straight members 26 would cause a bump or thud each time they interacted with the shear bar, thus bringing about a machine possessing a considerable amount of undesirable vibration.

Figure 8A:
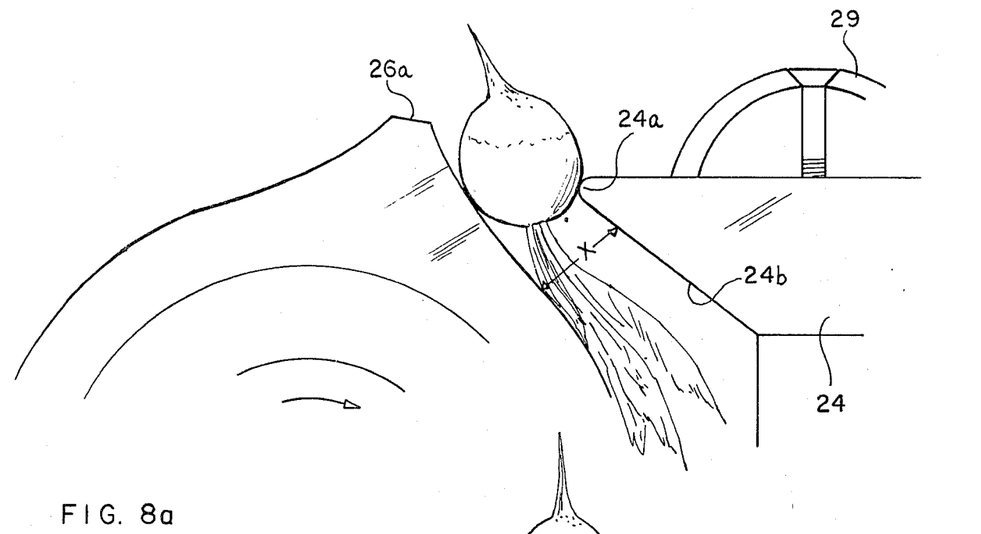
FIGS. 8a through 8c are related figures revealing in detail, the manner in which the machined edge of a shear bar and one of the flights of a rotary member interact to remove the stems from a red radish without exposing the body of the radish to any sharp edge likely to cut or damage the radish.
Figure 8B:
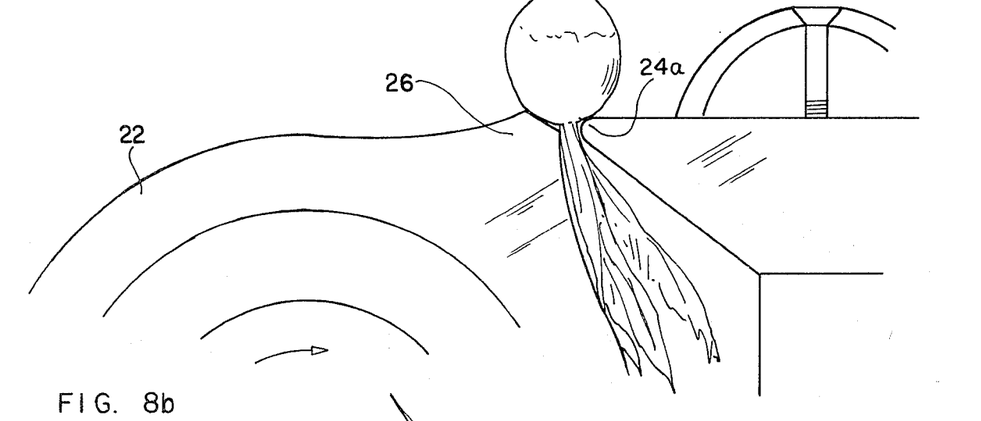
Figure 8C:
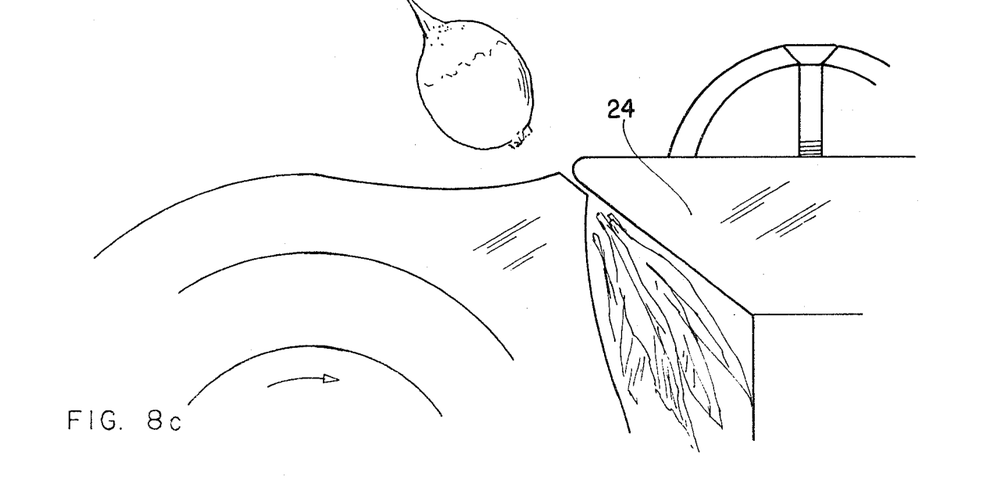

With regard to related FIGS. 8a through 8c, it will be recalled that the relationships of the rotary members to the shear bar have been described at some length hereinbefore, but it should be again mentioned that the shear bar 24 has a pair of edges 24a that I prefer to call machined edges. This is because in order to prevent damage to the radishes or other vegetables, I do not use shear bars sharpened to a knife edge, but rather use edges that for example are 0.040 inches thick, with the intersections being rounded to a 0.010 radius. From a careful study of FIGS. 8a through 8c, it will be seen how a typical radish interacts with the components of my invention primarily concerned with the removal of the stems and root from the radish. It will first be noted from FIG. 8a that a space X is selected between the root diameter of the member 22 and the lower side 24b of the shear bar, which distance determines the minimum size radish that will be acted upon. As is obvious, a radish smaller than dimension X can pass between the member 22 and the shear bar and fall into the bottom portion of the machine, so in a sense my device acts as a form of grader in that radishes smaller than a certain size are not acted upon.

It is thus important that the near edge 24a of the shear bar not be sharpened, but rather be machined to have a carefully rounded contour chosen such that it will not injure or mar the exterior of a radish and thus adversely affect its salability. Somewhat similarly, the radially outermost portion 26a of the helical flight is truncated so as to present no sharp surface to the radish. Nevertheless, these members cooperate in a most effective way to bring about a highly satisfactory shearing action. Wear of the interacting components is minimal, since there is no metal-to-metal contact.

It is important to note that the helical flight 26 joins the root circle of the member 22 at a small angle as shown in FIG. 8a, so as to represent no abrupt contour. Consequently, when a radish finds its way into a position between the member 22 and the machined edge 24a of the shear bar, it will essentially remain in that position until such time as a helically configured flight 26 comes by, at which time the radish will be pushed upwardly in a non-injurious fashion in the manner shown in FIG. 8a.

Partially aided by the water spray, the stems (or root) of the radish typically remain oriented in a position between the flight 26 and the machined edge 24a of the shear bar, where a shearing action is brought about as indicated in FIG. 8b, thus effectively severing the stems or the root from the radish, but without damage to the body or edible portion of the radish.

As shown in FIG. 8c, a very close tolerance is maintained between the flattened portion 26a of the member 26, and the near edge of the shear bar, such that even a piece of paper disposed between these members during testing procedures will be sheared. I typically maintain the clearance between 0.0005 and 0.0025 inches. Hereinafter I describe the adjustment arrangement I use for carefully setting the height as well as the lateral adustments of the shear bar in order that the very tight clearance described above can be effectively maintained.

As is obvious, because the members 22 and the shear bar are typically several feet long, a number of opportunities are presented for shearing the undesired components from the radishes during their travel down the planar array. Therefore, even though in FIG. 8b the radish root has not as yet been sheared, it will ordinarily be sheared very shortly thereafter, such as during next encounter between this radish and one of the helically disposed flights interacting with the shear bar. It is a rare circumstance indeed that a radish emerges in an improperly trimmed condition at the outlet portion of the machine.

Figures 9, 9A:
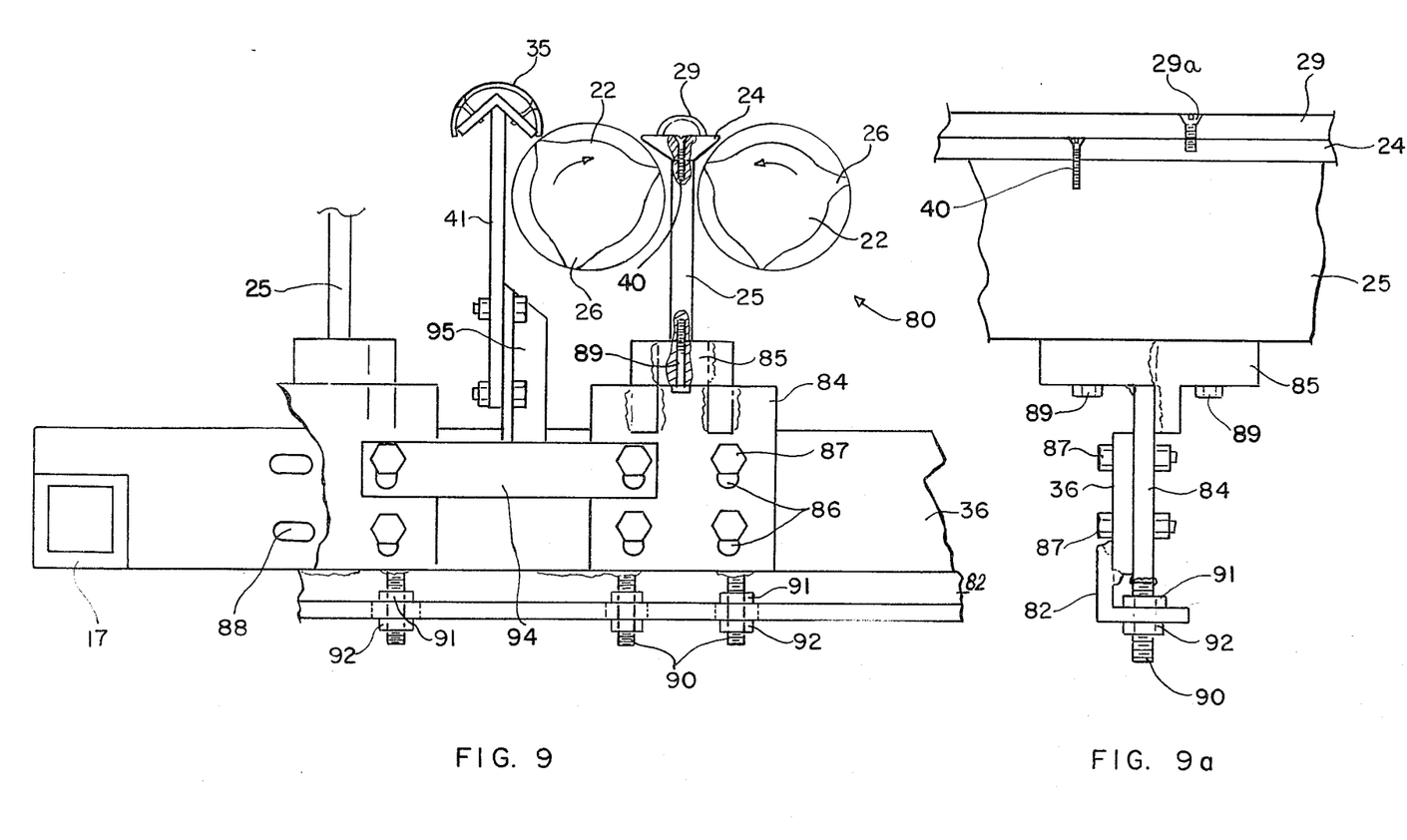
FIG. 9 is an end view of a trimmer unit to a smaller scale than in FIG. 7 so as to reveal the means utilized in the precise adjustment of the machined edges of the shear bar so that they properly interact with the flights of the elongate rotary members.
FIG. 9a is a fragmentary view related to FIG. 9 but turned 90 degrees therefrom in order to illustrate other details of the micrometer type of height adjustment means used in connection with the shear bar.

Turning to FIG. 9, it will there be noted that I have shown in some detail, the shear bar suspension arrangement preferred. It will be recalled that the shear bar 24 is directly supported by an upstanding support member 25 whose length is the same as the preferred length (54") of the shear bar.

Figure 10:
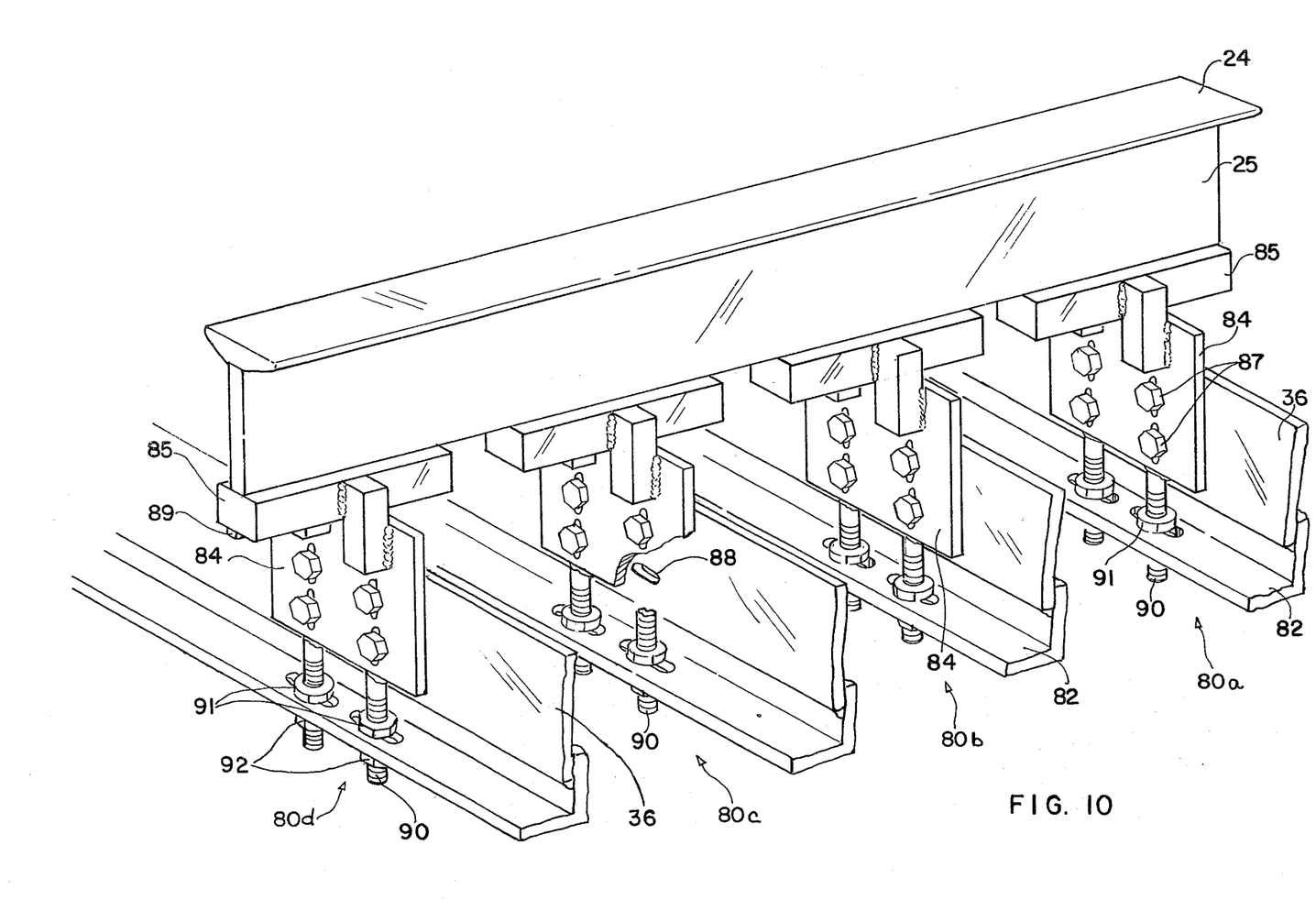
FIG. 10 is an overall perspective view of the several height adjustment stations typically associated with the mounting of a shear bar such that the machined edges of the shear bar can be brought into a very precise relationship to the flights of each rotary member used with that shear bar.

At several locations along the length of support member 25 is a shear bar support station 80, entailing the use of the laterally disposed support members 36, each of which extends the full width of the machine. As shown in FIG. 10, I may use four stations, designated 80a through 80d in order that the shear bar 24 will be supported in a very close relation to the helically configured flights 26 throughout its length. It is most important to note that at each support station, there is a precise adjustment arrangement of the type shown in FIG. 9, with such enabling a very close tolerance to be established between the machined edges of the shear bar and the flights 26, as will permit a piece of paper inserted at any location between the shear bar and the flights to be cut.

The elongate, laterally disposed support members 36 are of steel preferably ½ inches thick and three inches high, with each end of each member 36 resting on a respective frame member 17. Welded along the bottom of each member 36 in the manner shown in FIGS. 9 and 9a is an angle member 82, which forms the support for the respective adjustment stations now to be described.

Preferably four adjustment plates 84 concerned with the support of each shear bar are provided, each equipped with a suitable pattern of vertically elongate slots 86, and secured by means of bolts 87 to the member 36, with the aforementioned slots permitting suitable vertical adjustments of the shear bar 24 at each station. A similar pattern of slots 88, but that are elongate in the horizontal direction, are provided in member 36 so that on occasion, the shear bar 24 can be carefully and selectively moved by certain subsequently described adjustments so as to achieve equidistance from the rotary members 22.

Welded at spaced apart locations on the bottom of each plate 84 are a pair of vertically disposed threaded bolts or studs 90, with each stud being arranged to extend through suitable slotted holes in the horizontal portion of the angle member 82, as shown in FIGS. 9, 9a and 10. A pair of nuts are utilized on each threaded stud 90, with a nut 91 being located above and a nut 92 below the member 82, with the selective adjustment and tightening of each pair of nuts 91 and 92 enabling the height of the shear bar with respect to the flights 26 of each member 22, as well as the lateral relation of the shear bar thereto, to be carefully established.

Each plate 84 serves as the support for a short, sturdy member 85, such as of key stock, with the member 85 being secured by welding to the upper edge of plate 84. A plurality of short pieces of key stock are welded vertically between the members 84 and 85 in order to insure rigidity of the arrangement. I preferably secure each member 85 to the underside of the member 25 by the use of a plurality of vertically-disposed bolts 89, with the use of four or so members 85 affording good support for the shear bar; note FIG. 10. The members 85 may each be say six inches long, with the distance between these members being from say four inches to eight inches, depending on the installation.

As should now be clear, upon loosening the bolts 87 to a condition in which they are merely snug, the associated plates 84 may thereafter be carefully adjusted by nut manipulation so as to place the member 25 in a proper vertical position that is equidistant from the rollers 22, and thereafter the height relationship of the shear bar to the flights 26 carefully brought about. Any needed lateral shifting of the member 25 and the shear bar is of course brought about by a differential adjustment of the nuts 91 (and/or 92) at each station.

Before proceeding with a description of the manner in which shear bar height is adjusted, it should be pointed out that the rotary members 22 are first placed in a parallel relation to each other. This is accomplished by threading the lower bolt 71 of each bearing support member 37 into the tapped hole 70 in member 39 (see FIG. 7), and thereafter inserting the upper bolt 72, through the slot 74 in upper end of member 37, and thence into member 39.

The previously-mentioned lower holes 70 in the bearing plate are each precision located and tapped, so as to form an accurate pivotal point. The slots 74 permit motion of the bearing housings 37 about the lower support bolts 71, and these bearing housings are moved very carefully until such time as each shaft center is equidistant from member 25, with of course the members 26 being able to clear the member 25.

When the shaft centers on each end are the same height and equidistant from center of 25, they may for example be 4¼" apart. The nuts of upper bolts 72, and the lower bolts 71 are then tightened. Typically, no more adjustments of these bolts is necessary.

The next step is to move the shear bar 24 downwardly until such time as the machined edges of shear bar make contact with the helical members 26 of the respective rotary members 22. Typically, the machined edge of the shear bar will contact each of the flights of each member 22 in at least one place, for each position of the member 22.

The four support bolts 87 of each adjustment plate 84 are now snugged. The lower nuts 92 of the threaded studs 90 at the extreme stations (stations 80a and 80d) are now loosened, and the upper nuts 91 of these studs are turned slightly in the tightening direction in order to raise shear bar 24 very slightly off of helical member 26. I prefer to use rotary members 22 of such length that each of the helical flights, such as flights 26a, touches the shear bar 24 at two widely spaced locations.

By virtue of having provided two intermediate stations, stations 80b and 80c, I can now proceed by careful nut adjustment to bring the machined edges of the mid portion of the shear bar into proper alignment with each of the helical members 26 with which it is associated.

In accordance with the typical procedure, the pair of upper nuts 91 associated with the plate 84 at Station 80a are tightened in equal amounts, this serving to cause the shear bar to lift away from contact with a first flight, say flight 26a. The pair of nuts 91 associated with plate 84 at Station 80d are also turned in equal amounts in the tightening direction, and because of the arrangement preferably used herein, this causes this end of the shear bar to lift away from contact with the same flight, but of course at the far end of the flight from Station 80a. The four bolts 87 at Stations 80a and 80d are now tightened.

The upper nuts 91 at Stations 80b and 80c are now tightened in equal amounts until such time as each roller 22 will turn freely, but while maintaining a very close relationship with the shear bar. At this point the four support bolts 87 at Stations 80b and 80c are tightened. If the clearance between the shear bar and the flights is 0.0005 to 0.0025, the adjustment is correct, but this realistically is not achieved without going through the adjustment procedure for all four stations several successive times.

For example, if improper adjustment is found at any station, this necessitates loosening the four support bolts 87 at that station so that they are merely snug, and thereafter adjusting the height adjustment nuts in a very careful manner. This latter can include either tightening the upper nut or tightening the corresponding lower nut, as will effect the micrometer type vertical adjustment of the plate 84.

More particularly, when the upper pair of nuts 91 are tightened against some resistance of the four bolts 87, this causes the shear bar to lift away from the corresponding flight, whereas tightening the lower nuts against the drag of the four bolts 87 causes the shear bar to approach the flight. After the four bolts 87 are tightened, it may be found that the shear bar clearance has changed so as to put the arrangement out of tolerance, in which case it is now necessary to loosen the four bolts 87 to the snug position and go through the adjustment procedures again.

Sometimes, a slight adjustment of the shear bar can be achieved merely by tightening a nut 91 or 92, without loosening the nut on the same stud 90, located on the other side of the angle member 82. More typically, however, the nut on the other side of member 82 is loosened an appropriate amount before the nut concerned with the desired adjustment is tightened.

After the machined edges of the shear bar are in the desired close relation to the flights of its pair of rotary members, the members 35 are installed in the desired position between a rotary member 22 of each of two adjacent trimmer units, in the manner shown in FIG. 9.

As depicted in FIG. 9, a member 94 extends between a bolt 87 of each of a pair of members 84, with a vertically extending member 95 in the mid portion of member 94 directly serving as the support for member 41. As shown in FIG. 9 as well as FIG. 4, member 41 has sidewardly extending portions to which the sides of each member 35 are secured. Typically I do not install the members 94, 95 nor the members 41 and 35 supported thereby until I have carefully located the shear bars in their precisely correct positions.

As should now be apparent, I have described a novel trimmer machine that on the one hand has no sharpened edges that can damage the body of a radish or other vegetable so as to adversely affect its saleability, yet on the other hand can achieve a highly satisfactory trimming of the vegetables such that the stems and root are in each instance closely and cleanly removed. The novel flighted members 22 may be caused to rotate at a wide range of speeds, with rotational speed being controlled by appropriate restriction of the oil passing through the hydraulic motor 50. A commercially available speed controller may be employed for this purpose. The limiting factor in controlling rotor speed is the speed at which the radishes tend to hop or bounce out of contact with the flights 26. I find that a satisfactory speed for the exemplary form of machine described herein is typically 100 to 120 revolutions per minute, but the speed of the members 22 can be increased or decreased as particular conditions warrant.

As to the positional relationships of the flighted members 22 to each other in a rotational sense, this is of course established at the time the sprockets are installed on the ends of the shafts 22b, and the chain 44 placed over the teeth of the sprockets. However, I typically arrange the rotational positions of the members 22 such that the points at which the flights of one of these members are interacting with the respective machined edge of the shear bar are essentially in alignment with the points at which the flights of the adjacent member 22 are interacting with the other machined edge of that shear bar. I am not to be limited to the number of flights on each rotary member 22, and a greater or lesser number than three flights on each member may be employed.

I claim:

1. A trimmer unit for the removal of stems, roots and the like from vegetables without the use of sharpened members, comprising an elongate, stationary shear bar having a pair of opposed machined edges, and an elongate rotary member operatively disposed on each side of said shear bar, and essentially parallel thereto, each rotary member having at lease one raised, helically disposed portion on its exterior, arranged to be driven in close proximity to the respective machined edge of said shear bar, said shear bar and the pair of rotary members constituting a planar array upon which vegetables can be poured, with the interaction of the helically disposed portions with the machined edges of said shear bar bringing about the ready removal of the stems and roots from the vegetables without damaging their saleability, said shear bar being supported essentially continuously along its length by an elongate support member, said shear bar and said support member together forming a configuration having a substantially T-shaped cross section, a shear bar support station located under each end of said elongate support member, with at least one support station also being located between the end stations, each support station having precision adjustment means such that the clearance between said machined edges and said helically disposed portions can be minimized while still avoiding direct contact therebetween.

2. The trimmer unit as defined in claim 1 in which one end is higher than the other, such that gravity is a factor in causing the vegetables to move along the length of the unit.

3. The trimmer unit as defined in claim 1 in which an oscillating spray of water located above the unit serves to direct water downwardly, which oscillating spray serves not only to keep the shear bar clear of debris, but also helps move the vegetables toward a discharge end of the unit.

4. The trimmer unit as defined in claim 1 in which it is utilized in conjunction with one or more substantially identical trimmer units in a planar array, with all of the rotary members being powered from a common driving means.

5. The trimmer unit as defined in claim 1 in which the helical portions of said rotary members are of opposite hand, and said members are driven in opposite directions of rotation such that said helical portions tend to carry the vegetables toward the machined edges of said shear bar.

6. A machine for accomplishing the removal of leaves and other unwanted portions from vegetables, comprising an elongate shear bar having two opposed, machined edges, and a pair of elongate members mounted for rotation in close proximity to said machined edges, each of said rotary members being of the approximate length of said shear bar and each having at least one helically configured raised portion extending along a substantial portion of its length, with the raised portion of each rotary member being arranged to operate close to the respective machined edge of said shear bar, such that a shearing action without the use of sharpened edges can be accomplished, the direction of rotation of each of said elongate rotary members with respect to the adjacent machined edge of the shear bar, and the angle of the helically configured raised portions thereon being such as to cause vegetables or the like to be moved toward one or the other of the machined edges of said shear bar, such that leaves, roots, or other unwanted components can be sheared in a non-damaging manner from the vegetables as a result of the interaction between the raised portions of the rotary members and the respective machined edges of said shear bar, said shear bar being supported essentially continuously along its length by an elongate support member, said shear bar and said support member together forming a configuration having a substantially T-shaped cross section, a shear bar support station located under each end of said elongate support member, with at least one support station also being located between the end stations, each support station having precision adjustment means such that the clearance between said machined edges and said helically disposed portions can be minimized while still avoiding direct contact therebetween.

7. The machine as defined in claim 6 wherein said shear bar and rotary members are in a coplanar array, with one end of the array being lower than the other, such that vegetables poured over the upper end of the array will travel the length of the array at least partly under the influence of gravity.

8. The machine as defined in claim 7 in which an oscillating spray of water located above the coplanar array serves to direct water downwardly, which oscillating spray serves not only to keep the shear bar clear of debris, but also helps move the vegetables toward a discharge end of the machine.

9. The machine as defined in claim 6 in which the helical portions of said rotary members are of opposite hand, and said members are driven in opposite direction of rotation such that said helical portions tend to carry the vegetables toward the machined edges of said shear bar.

10. The machine as defined in claim 6 in which said shear bar and its pair of elongate members represent a trimmer unit, which is utilized in conjunction with one or more substantially identical trimmer units in a planar array, with all of the rotary members being powered from a common driving means.

11. The machine as defined in claim 10 in which said common driving means includes the use of an endless chain for driving said rotary members in rotation, said chain being powered by a hydraulic motor.

12. The machine as defined in claim 10 in which a first conveyor belt is utilized for bringing vegetables to be trimmed to the trimmer units of said planar array, and a second conveyor belt is utilized for removing the trimmed vegetables therefrom.

* * * * *